United States Patent [19]

Rüger

[11] 4,137,027
[45] Jan. 30, 1979

[54] EXTRUDERHEAD

[75] Inventor: Wolfgand Rüger, Hohenbuchen u. Alfeld, Fed. Rep. of Germany

[73] Assignee: Karl-Heinz Schmidt, Fed. Rep. of Germany

[21] Appl. No.: 798,082

[22] Filed: May 18, 1977

[30] Foreign Application Priority Data

May 18, 1976 [DE] Fed. Rep. of Germany ....... 2622011

[51] Int. Cl.² .............................................. B29F 3/04
[52] U.S. Cl. ................................ 425/133.5; 425/188; 425/192 R; 425/462
[58] Field of Search ...................... 425/133.5, 462, 190, 425/192 R, 380, 467, 188, 376 R, 133.1; 264/171, 245

[56] References Cited

U.S. PATENT DOCUMENTS

| 2,444,831 | 7/1948 | Kilborn | 425/462 X |
| 3,488,807 | 1/1970 | Vossen | 425/192 |
| 3,611,492 | 10/1971 | Scheibling | 425/133.5 |
| 3,902,835 | 9/1975 | Theysohn | 425/192 X |

FOREIGN PATENT DOCUMENTS

| 2109607 | 9/1971 | Fed. Rep. of Germany | 425/467 |
| 2201631 | 8/1973 | Fed. Rep. of Germany | 425/192 R |

*Primary Examiner*—Francis S. Husar
*Assistant Examiner*—Mark Rosenbaum
*Attorney, Agent, or Firm*—Robert E. Burns; Emmanuel J. Lobato; Bruce L. Adams

[57] ABSTRACT

For the extrusion of a composite strip formed of two kinds of material two screw extruders are arranged one above the other. The lower extruder is horizontal while the upper extruder is inclined downwardly so that both extruders extrude through a common extruderhead. The extruderhead comprises a fixed central portion having converging opposite faces and hinged upper and lower jaws on opposite sides of the central portion. Interchangeable insert plates are secured on opposite sides of the central portion of the extruderhead and on the inner faces of the upper and lower jaws. The insert plates are provided with cooperating channels to define the shape of the extruded strips and the portions of the strips which are formed, respectively, of material from the upper and lower extruders. The upper and lower jaws are movable hydraulically between a closed position for extrusion and an open position for cleaning and for changing the insert plates so that different shapes can be extruded and selected portions of the extruded shapes can be formed of different materials.

9 Claims, 28 Drawing Figures

EXTRUDERHEAD

FIELD OF INVENTION

The present invention relates to an extruderhead of divided construction for use on two superposed screw extruders for extruding flat profiles of different mixtures. The extruderhead comprises three parts of which the middle part is fixed to the screw extruders while upper and lower parts are hinged. Channels for the material to be excluded are inclined with respect to a horizontal extruder plane so as to lead upwardly and downwardly from the respective cylinders of the extruder presses to a common extruder nozzle.

BACKGROUND OF THE INVENTION

German Pat. App. No. P2201631.5 discloses an extruderhead of divided construction for connection to two superposed screw extruders to form shapes of different compounds. The extruderhead is divided into two planes which are inclined upwardly and downwardly from the horizontal extrusion plane to the cylinders of the extruders. The extruderhead is composed of three parts of which the middle part is fast with the screw presses while the other two parts are hinged so that the two outer parts are held together during operation of the extruder by two horizontally slidable clamps which have clamping faces that are slightly inclined to the horizontal and which support opposed clamping faces of the hinged parts. The two outer parts lie against supporting faces of the middle part which are inclined with respect to the horizontal with an inclination opposite the inclination of the parting plane. This extruderhead is characterized by being easy to open and also easy to clean. The flow channels of the extruderhead lie wholly in the parting plane so that material remaining in the channels can be easily removed. In this extruderhead there are no channels in the form of tubing.

An extruderhead of this kind can be designed for a group of products which are of similar form. It can also be designed to produce other groups of products. However, there are disadvantages which become greater with greater differences in the profile cross section. These disadvantages are the following. With small profiles an undesirable pressure builds up in at least one of the extruderhead parts which by reason of the relatively large material guiding faces produces a high load force on the head. It forms unfavorable slow points which can lead to temperature rise and particularly to prevulcanization of the material to be extruded. In some parts of the flow channel material can dwell for a longer time. This results at elevated temperatures which can lead to prevulcanization and heterogeneousness in the mixture. When the portions of material which have been retained at higher temperature in unfavorable locations in the flow path are freed after a period of time and again enter in the stream of material they cause noticable homogenity disturbing characteristics in the product.

These disadvantages in products which on account of their profile cross section cannot satisfactorily be produced with an extruderhead of this kind narrows down the range of products that can be produced with this kind of extrusionhead. For this reason it is necessary to use several extruderheads for one on the same extruder unit in order to produce a wide product line. The initial cost of several extruderheads is considerable. Moreover, production time is lost by reason of the installation time involved in changing the extruderheads.

In the production of particular flat profiles there is also the disadvantage that the screws of the extruders cannot be pulled out through the opened extruderhead because the walls of the flow channels are so formed that they are in the way of pulling out the screws. This greatly increases the difficulty of cleaning or of changing over the extruder apparatus.

SUMMARY OF THE INVENTION

It is an object of the present invention not only to provide greater ease of cleaning the apparatus but also to provide an unlimited adaptability to the form and size of the desired product line. This is achieved by forming the flow channels in insert plates which are insertable in receivers provided in the three parts of the extruderhead.

The forming of the flow paths in insert plates has the advantage that in changing from one group of profiles to another group of profiles of quite different profile cross section of the material part of one extruder relative to the material part of the other extruder it is only necessary to change the insert plates in order to obtain optimal matching with respect to amount of flow and flow characteristics. However, if in addition it is desired to change the transport characteristics of one or the other extruder, this can easily be done by also taking out the conveying screw of the extruder when removing the insert plate. There is thus provided an unlimited possibility of matching the form and size of the desired product strands also with respect to the number of strands and strands parts. If for example, it is desired to produce on the extruder installation a side strip composed of two different material parts for automobile tires it is possible through changing of the insert plates, to produce one or two running strips with so called mini-skirts or one or more bead filling cores. Also side strips as well as all similar parts for all other uses with greatly different geometrical form can be produced from two different compositions in optimal manner merely by interchanging the insert plates.

In this manner a better technical and economical utilization of the apparatus can be achieved. It is no longer necessary to accept a compromise solution by being bound to one group of profiles since greatly different groups of profiles can be produced with optimal form design by selection of corresponding insert plates.

It is advantageous if the insert plates have a tapered cross section in the flow direction of the material to be extruded which is preferably wedge shaped. With this construction the insert plates under the pressure of the compressed material are held fast on the mounting surfaces of the parts of the extruderhead. Moreover, this wedge shape has the further advantage that the way is clear to take out the screws of the extruders when the extruderhead is opened and the insert plates are removed.

It is advantageous if the mounting surfaces for the insert plates are flat and are provided with matrix form screw holes and/or centering holes or projections and/or quick release fasteners. This kind of matrix of screw holes and centering recesses or projections accommodates all locations of screw points and centering points for the different inserts and provides the possibility of securing each insert in an optimal manner on the mounting surface.

It is also advantageous if removable bars are mounted in the flow channels of the insert plates by means of screws which extend through to screw holes in the mounting surfaces of the extruderhead parts. Such bars make it possible to optimize the flow of the material to be extruded with regard to the desired profile characteristics.

BRIEF DESCRIPTION OF DRAWINGS

The nature and advantages of the invention will be more fully understood from the following description in conjunction with the accompanying drawings which illustrate schematically preferred embodiments. In the drawings:

In FIGS. 5A – 5D to 10A – 10D:

A is a view of an insert plate of the upper extruder,

B is a cross section through the product strip or strips to be produced,

C is a view of an insert plate of the lower extruder, and

D is a schematic illustration of the flow paths to the plane of division of the extruderhead.

DESCRIPTION OF PREFERRED EMBODIMENTS

Figure 1:
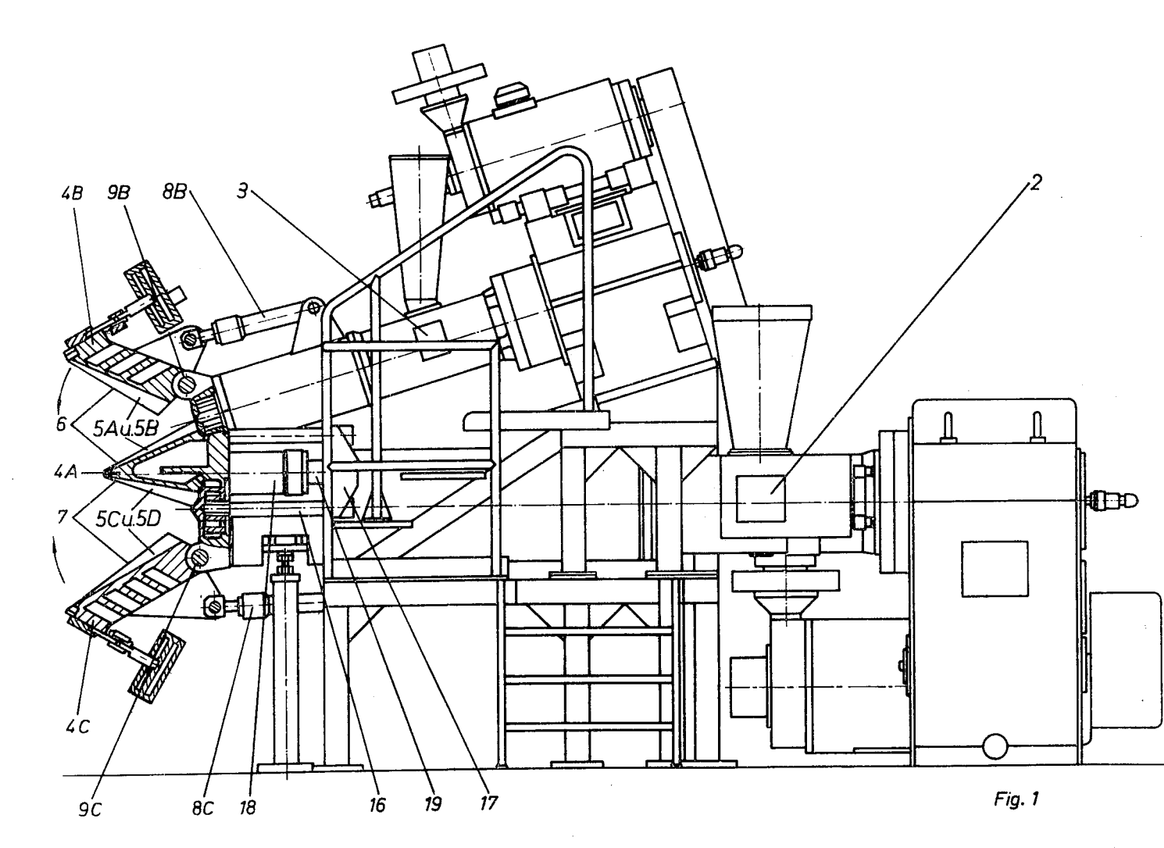
FIG. 1 is a vertical section through an extruder installation with the extruderhead open.
Figure 2:
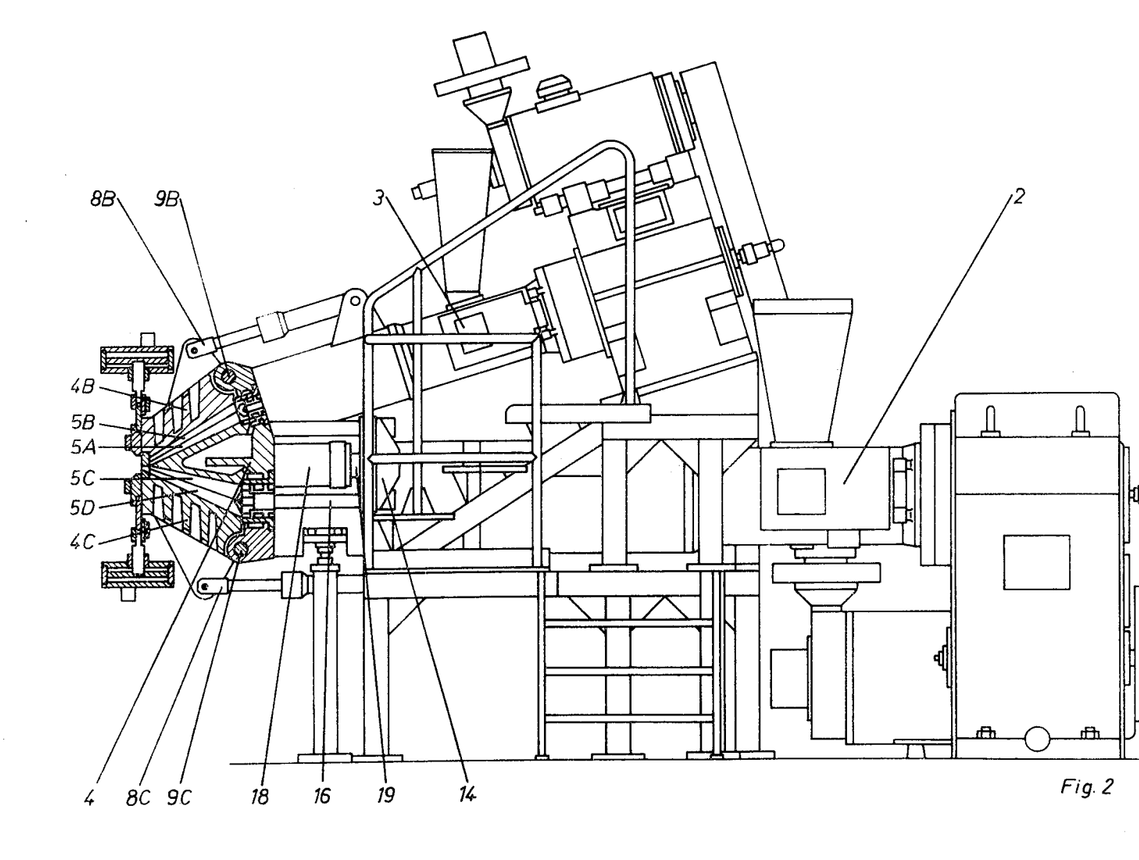
FIG. 2 is a vertical section through the extruder installation with the extruderhead closed.

The extruder installation shown by way of example in the drawings comprises a horizontally arranged screw extruder 2 and a second screw extruder 3 which is arranged above the horizontal screw extruder 2 and is sloped downwardly so that both screw extruders 2 and 3 feed to the same extruderhead 4 which is in position to extrude composite flat profiles formed of different kinds of rubber material fed respectively by the two screw extruders. The extruderhead 4 is divided into three parts namely a middle part 4A which is fixed on the forward ends of the extruders, an upper part 4B which is hinged by a shaft 9B so as to swing upwardly from closed position, as illustrated in FIG. 2, to open position, as illustrated in FIG. 1, and a lower part 4C which is hinged by means of a shaft 9C so as to swing downwardly from closed position to open position. The extruderhead 4 further comprises insert plates 5A, 5B, 5C and 5D which are mounted on the opposite faces of the middle part 4A of the extruderhead and on the inner faces of the hinged upper and lower parts 4B and 4C. These insert plates 5A, 5B, 5C and 5D lie in the planes of division 6 and 7 between the middle part 4A of the extruderhead and the upper and lower parts 4B and 4C. The insert plates 5A, 5B, 5C and 5D are provided on inner faces with flow paths 1 which are formed by channels which are open when the extruderhead is open, as shown in FIG. 1, and closed channels when the extruderhead is closed. The flow channels 1 in the insert plates 5A, 5B, 5C and 5D are arranged to conduct the rubber material fed by the respective screw extruders to the extruder opening or openings formed by the discharge ends of the upper and lower extruderhead members so as to form a composite strip or strips having selected portions formed of the respective rubber compositions.

The hinged upper and lower extruderhead portions 4B and 4C are moved between open and closed positions by means of hydraulic cylinder and piston units 8B and 8C which are arranged to swing the parts 4B and 4C about the pivot shafts 9B and 9C respectively. When in closed position, the extruderhead parts 4B and 4C are held together by clamps (not shown) which are arranged at the sides of the extruderhead. These clamps are operated by draw bars 16 which are connected to a common cross tie girder 17 secured to the piston rod 19 of a hydraulic cylinder and piston unit 18. The clamps are thus operable hydraulically by means of the cylinder piston unit 18.

Figure 3:
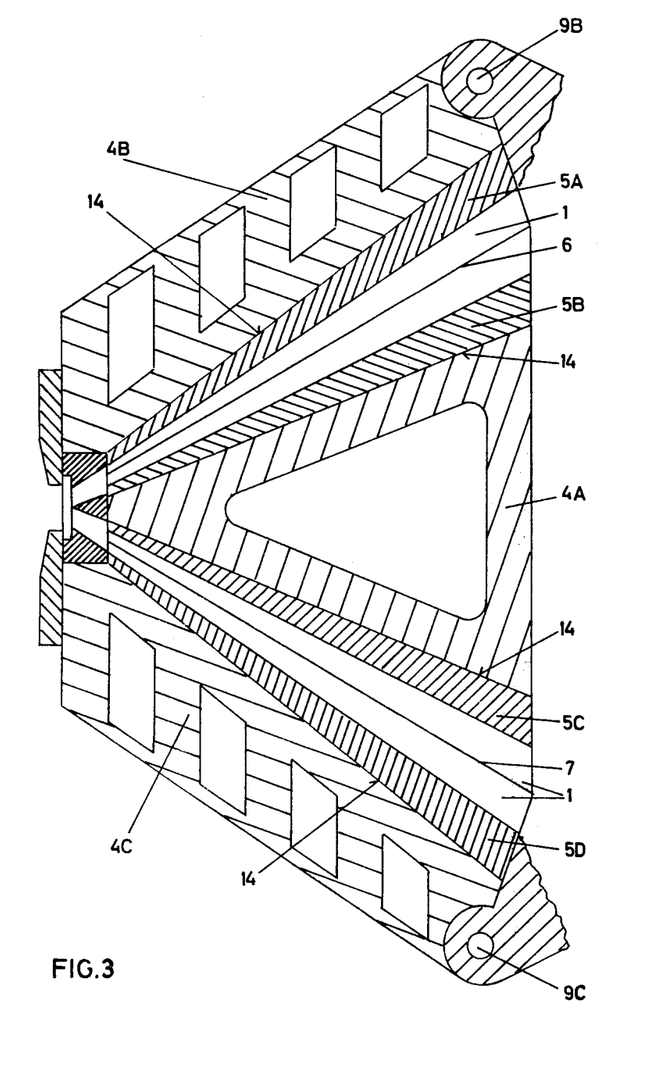
FIG. 3 is an enlarged schematic section of the extruderhead of FIGS. 1 and 2 shown in closed position.

A vertical section of the extruderhead in closed position is shown on a larger scale in FIG. 3. The insert plates 5A, 5B, 5C and 5D are secured on mounting faces 14 of the middle part 4A and the upper and lower parts 4B and 4C of the extruderhead. In the flow direction of the material to be extruded, the insert plates are tapered so as to be wedge shape. Thus as seen in FIG. 3, the insert plates are thicker at their inner ends. By reason of this wedge shape, the pressure of the material being extruded presses the insert plates against the supporting surfaces of the mold parts with a component of force opposite to the direction in which the material is extruded so as to counteract any drag exerted by the material being extruded on the insert plates. Moreover, with this construction the way is clear for removal of the screws of the extruders when the extruderhead is open and the insert plates are removed.

Figure 4:
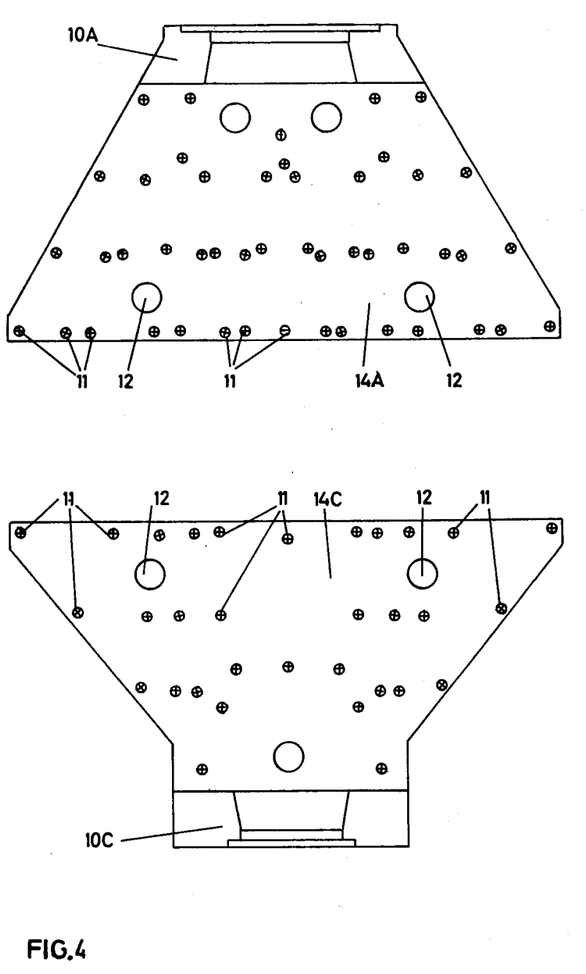
FIG. 4 is a schematic view showing the mounting faces for receiving the insert plates of the extruderhead.
Figure 5A:
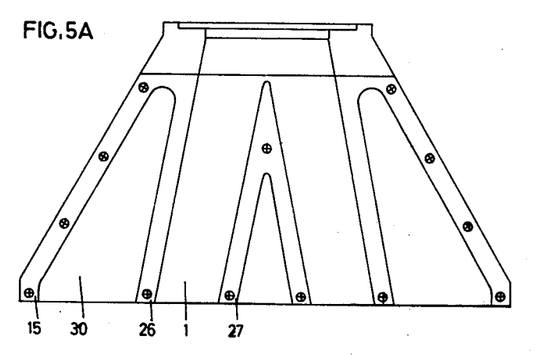
FIGS. 5A – 5D illustrate insert plates for the production of small side strips for automobile tires.
Figure 5B:
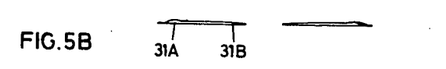
Figure 5C:
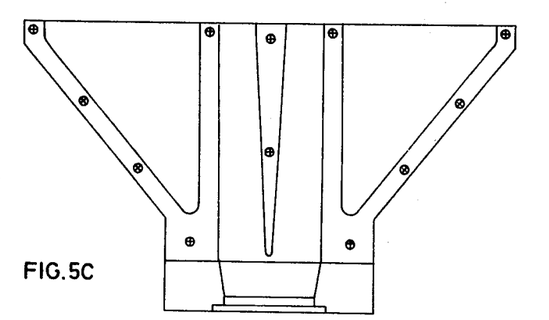
Figure 5D:
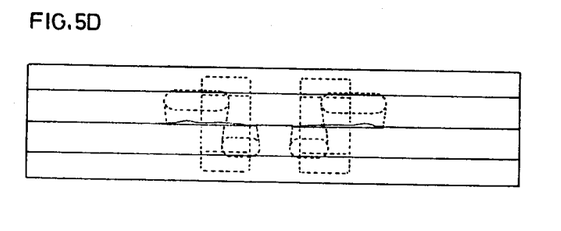
Figure 6A:
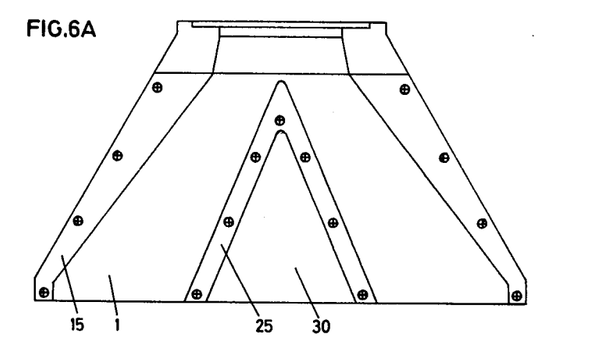
FIGS. 6A – 6D illustrate insert plates for the production of wide side strips.
Figure 6B:
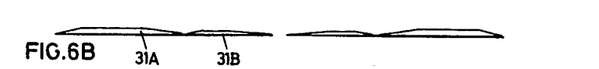
Figure 6C:
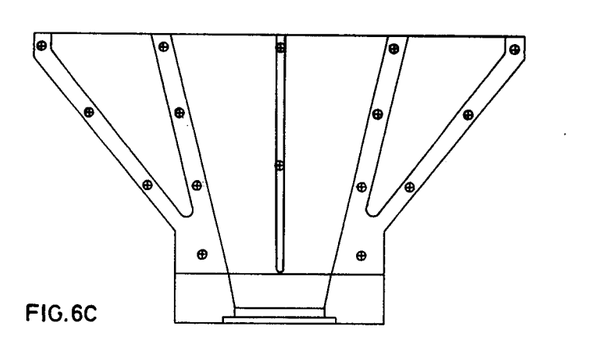
Figure 6D:
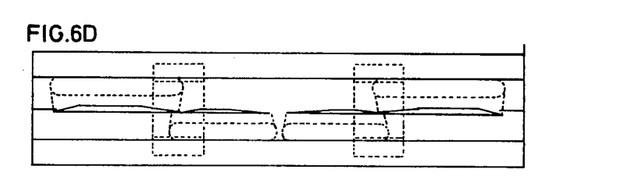
Figure 7A:
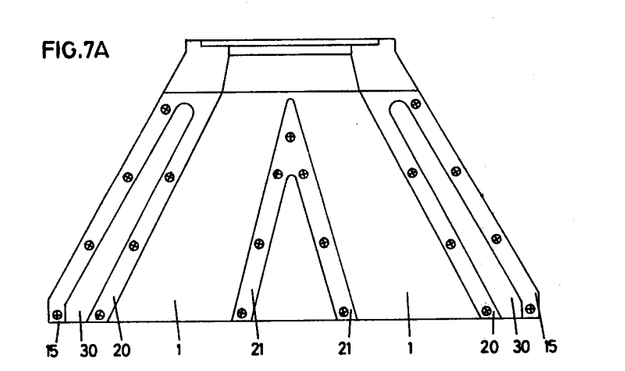
FIGS. 7A – 7D illustrate insert plates for the production of high side strips.
Figure 7B:
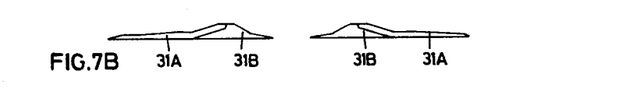
Figure 7C:
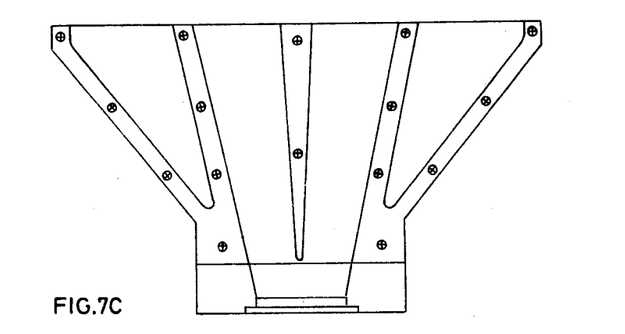
Figure 7D:
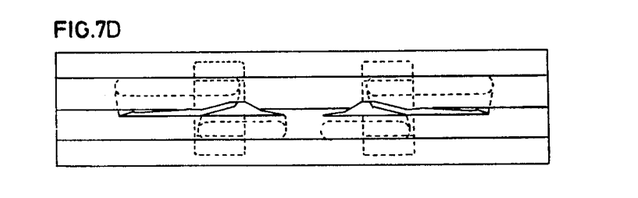
Figure 8A:
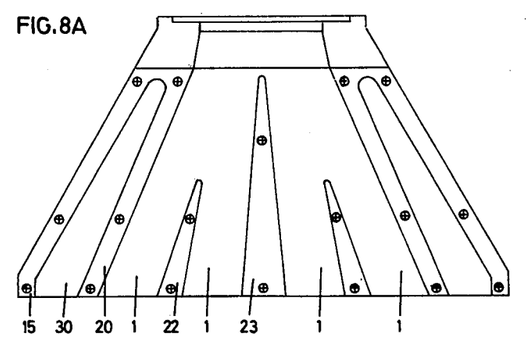
FIGS. 8A –8D illustrate insert plates for the production of bead filling cores.
Figure 8B:
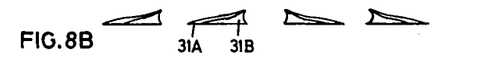
Figure 8C:
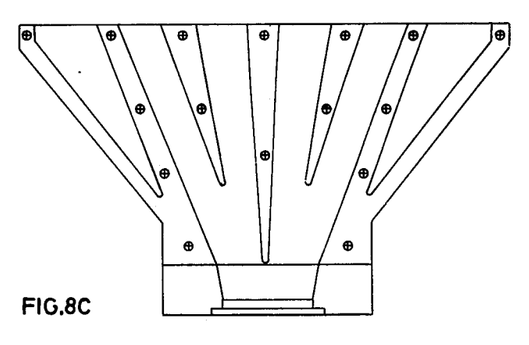
Figure 8D:
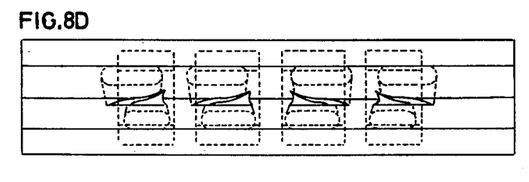
Figure 9A:
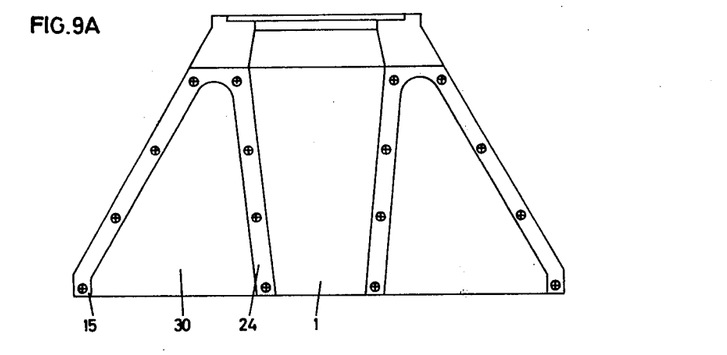
FIGS. 9A – 9D illustrate insert plates for the production of a tread strip with mini-skirts.
Figure 9B:
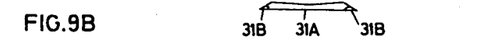
Figure 9C:
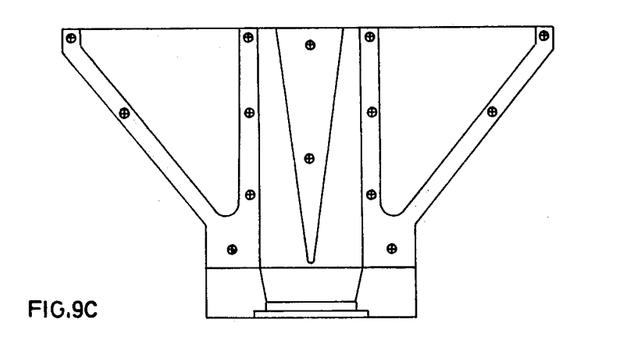
Figure 9D:
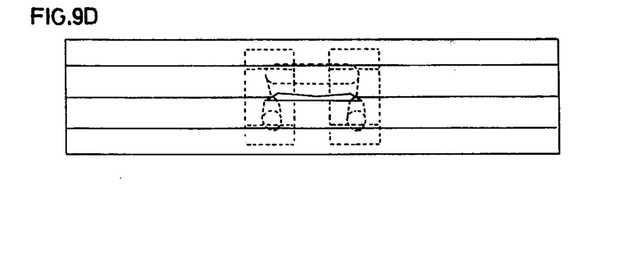

The insert plates 5A, 5B, 5C and 5D are positioned on the mounting surfaces of the extruderhead parts by means of centering holes or projections and are secured in place by screws screwed into tapped holes in the respective mounting faces of the extruderhead parts. Two of the mounting faces 14A and 14C are shown by way of example in FIG. 4 together with intermediate parts 10A and 10C between the mounting faces 14A and 14C of the extruder. Each of the mounting faces 14A, 14C is provided with a plurality of tapped holes 11 to receive screws for securing the insert plates to the extruderhead parts. The tapped holes 11 are arranged in a matrix patter so as to provide holes in all of the positions required for securing different insert plates to the mounting face of the extruderhead part. With this arrangement of holes all of the different insert plates can be accommodated. The mounting faces are further provided with centering holes 12 which are positioned to receive projections or pins on the insert plates so as to position the insert plates properly on the mounting surfaces. Instead of centering holes, the mounting surfaces of the extruderhead parts can be provided with pins or projections adapted to be received in corresponding recesses in the insert plates.

Figure 10A:
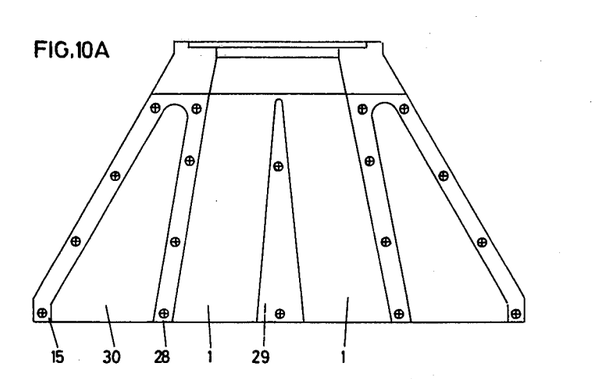
FIGS. 10A – 10D illustrate insert plates for the production of two tread strips with mini-skirts.
Figure 10B:
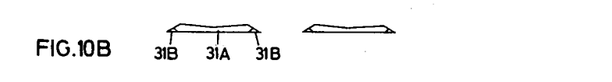
Figure 10C:
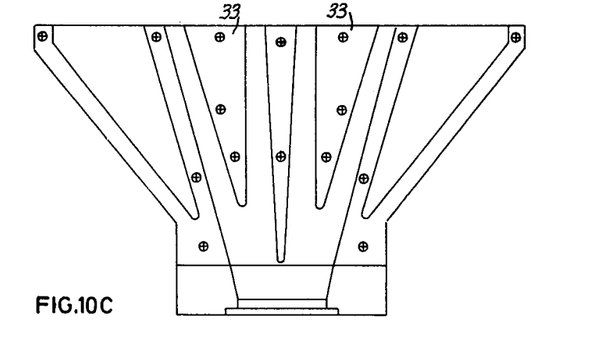
Figure 10D:
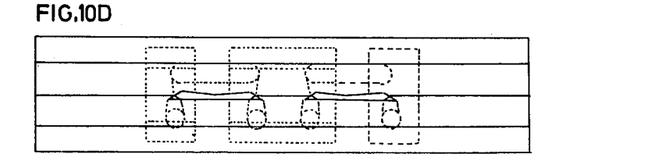

In FIGS. 5A – 5D to 10A – 10D different insert plates are illustrated by way of example. On the inner faces of the insert plates there are provided bars 20, 21, 22, 23, 24, 25, 26, 27, 28, and 29 which define flow channels 1 of the material to be extruded. Certain of the strips, for example strips 22 and 23 in FIG. 8A, and strips 33 in FIG. 10C are removable and are secured by screws which extend through the insert plate and are screwed into tapped holes in the supporting surface. At opposite sides of each insert plate there are provided bars 15 which support the two plates of a pair of plates. Hollow spaces 30 can be left between the bars. In FIGS. 5B to 10B there are illustrated by way of example composite strips formed with the respective insert plates. Each of the strips is composed of parts 31A and 31B of different material fed respectively by the two screw extruders 2 and 3. It will be understood that still other cross sectional shapes can be obtained by appropriate design of the insert plates. For example, strips can be formed with two cross sectional parts of the same material separated by an intervening part of the other material. The possibilities of the strips that can be produced is virtually unlimited.

I claim:

1. Extruder apparatus comprising an extruderhead having an inlet and an outlet and two screw extruders which converge at an acute angle to one another to feed material from both of said extruders to said head, said extruderhead comprising three parts, namely a wedge-shaped middle part which is fixed to said extruders and two outer parts which are disposed on opposite sides of said middle part and are hinged for movement between an open position and a closed position, said middle part having opposite outer faces which converge at an acute angle toward the outlet of said extruderhead and said outer parts having inner faces which face and are spaced from said opposite faces of said middle part, and insert plates removably mounted on and substantially covering said inner faces of said outer extruderhead parts and having channels on inner faces of said insert plates which define passages for extrusion of composite products of predetermined cross section formed partly of material from one of said extruders and partly of material from the other of said extruders when said hinged parts are in closed position, said insert plates being accessible for cleaning and for replacement when said hinged parts are in open position, and means operatively associated with said insert plates for positioning said insert plates on said outer extruderhead parts and for securing them removably in place on said outer extruderhead parts.

2. Extruder apparatus according to claim 1, in which said insert plates are wedge shaped so as to be of decreasing thickness in the direction of flow of the material being extruded.

3. Extruder apparatus according to claim 1, in which said positioning means comprises interfitting projections and recesses provided on said insert plates and said extruderhead parts.

4. Extruder apparatus according to claim 1, in which said securing means comprises tapped holes in insert plate supporting surfaces of said extruderhead parts and screws extending through holes in said insert plates and screwed into selected ones of said tapped holes.

5. Extruder apparatus according to claim 4, in which said tapped holes in said supporting surfaces of said extruderhead are arranged in a matrix pattern to accommodate screws in different locations for securing different insert plates to said extruderhead parts.

6. Extruder apparatus according to claim 4, in which removable bars in part defining flow channels on said insert plates are removably secured in place on said insert plates by screws which extend through holes in said insert plates and are screwed into selected ones of said tapped holes in said supporting surfaces of said extruderhead parts.

7. Extruder apparatus according to claim 1, in which each of said extruders comprises a cylinder and a screw removably received in said cylinder, and in which, with said hinged parts of said extruderhead in open position and said insert plates removed, the discharge ends of said cylinders are opened sufficiently to permit removal of said screws through said discharge ends of said cylinders.

8. Extruder apparatus according to claim 1, further comprising insert plates removably mounted on and substantially covering said opposite outer faces of said middle extruderhead part, and means associated with said middle extruderhead part for positioning said insert plates on said middle extruderhead part and removably securing them in place thereon.

9. Extruder apparatus according to claim 8, in which removable bars in part defining flow channels are removably secured on said insert plates mounted on said middle extruderhead part.

* * * * *